Aug. 26, 1958 S. E. JAROS ET AL 2,849,510
PROCESS FOR PREPARING HYDROCARBON DRYING OIL PRODUCT
BY CO-POLYMERIZING A BUTADIENE AND STYRENE
Filed Feb. 1, 1955 2 Sheets-Sheet 2

Joseph F. Nelson
Stanley E. Jaros   Inventors
By W. H. Smyers   Attorney

United States Patent Office 2,849,510
Patented Aug. 26, 1958

2,849,510

PROCESS FOR PREPARING HYDROCARBON DRYING OIL PRODUCT BY CO-POLYMERIZING A BUTADIENE AND STYRENE

Stanley E. Jaros, Watchung, and Joseph F. Nelson, Westfield, N. J., assignors to Esso Research and Engineering Company, a corporation of Delaware Application February 1, 1955, Serial No. 485,392

3 Claims. (Cl. 260—669)

This invention relates to a continuous process for making a drying oil by polymerization of a diolefin such as butadiene in the presence of an alkali metal catalyst, and is a continuation-in-part of Serial No. 420,498, filed April 2, 1954, now abandoned.

Valuable unsaturated polymers, including drying oils of excellent quality, can be made by polymerizing about 50 to 100 parts of butadiene-1,3 and about 50 to 0 parts of styrene at 25 to 95° C., preferably at 45 to 85° C., in the presence of finely divided alkali metal as the catalyst and of about 50 to 500 parts of an inert hydrocarbon diluent boiling between about 0 and 250° C., or preferably between 20 and 200° C., such as pentane, benzene, cyclo-hexane, naphtha, mineral spirits, or olefins. Where low boiling materials are used, it is desirable to operate under sufficient pressure to maintain the charge in liquid phase, e. g. under pressures ranging from 1 to 5 atmospheres. Certain promoting agents, e. g. about 10 to 100 parts of dioxane or diethyl ether and catalyst activators, e. g. 1 to 20 percent of isopropyl alcohol based on the weight of alkali metal, are also preferably added to the reaction mixture to assure the production of a colorless oil and to shorten the reaction time. Throughout this specification, all references to proportions of materials are expressed in parts by weight, unless stated otherwise.

When the reaction has reached the desired conversion, which may be about 50, 80 or preferably 100%, the catalyst is destroyed and converted into an easily filtrable salt by addition of surfuric acid or an essentially anhydrous monobasic saturated $C_1$ to $C_5$ organic acid which is soluble in the hydrocarbon mixture. The acid, such as formic, acetic or pentanoic, is added directly to the crude reaction product and the resulting alkali metal salt is thereafter separated from the crude product by filtration. Then the crude filtrate is fractionated to remove the promoting and activating agents as well as any unreacted monomer and also to adjust the concentration of the oily polymer in the product to the desired level, which may be between about 30 and 99% nonvolatile matter.

Unlike natural drying oils the resulting product is useful as a varnish without requiring any further treatment for purposes of bodying or the like, but nevertheless it is often desirable to subject the product to a heating step for about 30 to 240 minutes at about 120 to 180° C. It is particularly advantageous to carry out the heating step in the presence of a small amount of a polar compound such as maleic anhydride, acrylonitrile or thioglycolic acid, in which case the heating is done at 180 to 210° C. to effect reaction between the polar compound and the polymer. Higher temperatures may be used also, in which case bodying of the polymer will simultaneously occur.

When the original work was carried out in small scale batches, it became apparent that a drying oil or varnish of excellent quality was obtained. At the same time, however, it became apparent that the translation of the process into a large scale, commercial operation would involve serious difficulties. For example, the handling and destruction of relatively large amounts of alkali metal represents a manifest fire and explosion hazard. Secondly, whereas the initial induction period characteristic of the reaction was not particularly detrimental in small batch operation, since there it took up only a rather short time interval, the poisoning effect equivalent to the induction phenomenon in batch operation became a problem of the greatest magnitude in large scale or continuous operation.

Heretofore, in a continuous process wherein the reagents were fed to a one-stage equilibrium reactor and the polymerized product continuously withdrawn therefrom after a certain residence time, the impurities contained in the feed or the conditions responsible for the induction period lowered, by a poisoning action, the overall reaction rate to such an extent that the required residence time became uneconomically long and complete conversion was not attained even with these long residence times. The separation of the various non-hydrocarbon constituents such as ether, alcohol and acetic acid from the crude product, and in particular from the unreacted monomers, also represented an uneconomical step when translated from experimental into large scale production, inasmuch as normally at least three corrosion resistant distillation towers would be required. In such an experimental system the first tower would serve to separate the crude product into a bottom stream containing the oily polymer in solution in the hydrocarbon solvent and an overhead stream containing excess hydrocarbon solvent, unreacted monomer, ether promoter, alcohol and organic acid, such as acetic; this latter overhead stream would be fractionated in a second tower to give an overhead stream containing the ether promoter and alcohol and a bottoms containing the hydrocarbon solvent, if sufficiently high boiling, and acetic acid, finally, this bottom stream would be fractionated in a third tower to give acetic acid in an overhead stream and hydrocarbon solvent in a bottom stream, it being extremely important to keep any trace of acid from being recycled to the reaction zone.

In accordance with the present invention the above disadvantages are overcome and 100% conversion easily obtained by carrying out the polymerization in two or more reaction vessels arranged in series wherein the second and succeeding vessels are operated under a different set of conditions from the first vessel. For example, a higher temperature may be used in succeeding reactors than in the first; additional catalyst may be added, isopropyl alcohol may be added to succeeding reactors to activate the unused catalyst from the first reactor; part of the styrene may be withheld from the first reactor and added to one or more of the later ones; the catalyst may be kept molten in the later reactors; and a different catalyst such as peroxide or Friedel-Crafts type may be used in the second or succeeding reactors. At least two, preferably at least three, reactors may be used.

According to the invention, 50 to 100 parts of butadiene and 50 to 0 parts of styrene, are copolymerized in a multistage once-through continuous process in the presence of finely divided alkali metal catalyst, such as lithium, sodium, potassium, caesium and rubidium. The temperatures will vary from stage to stage. The first stage is suitably carried out at a temperature between 40 and 95° C. while the second stage and succeeding stages may be as high as 105° C. It is often desirable to carry out the second and succeeding stages at considerably higher temperatures than those used in the first stage. Suitable temperatures for the first stage then would be between 45 and 75° C. while those for the second and later stages would be between 55 and 105° C. The operation is carried out within these temperature ranges in such a manner that the temperature of any given stage is about equal to or higher than the immediately preceding stage. As a polymerization catalyst about 0.6 to 8 parts of finely divided alkali metal per 100 parts of monomers is used, preferably about 1 to 5 parts. The number of stages will depend on the reactivity of the polymerization system. If the desired degree of conversion is not obtained in two stages, one or more stages may be added.

The above choice of monomers is quite specific as halogen-containing monomers such as chloroprene or chlorinated styrene are not suited for polymerization in the presence of alkali metal. Higher homologues of butadiene, i. e. piperylene, isoprene, and dimethylbutadiene, are suitable for the purposes of the present invention. The replacement of styrene by its ring-alkylated homologues, such as para-methyl styrene, meta-methyl styrene, dimethyl styrene and the corresponding ethyl substituted homologues is the only variation of monomers permissible herein; however, styrene is the most practical from the economic standpoint. Alpha-methyl styrene is unsuitable because it is too unreactive toward alkali metal.

Materials used as diluents in the polymerization should be liquid at the polymerization temperature, that is, they should boil between 20 and 250° C., although more volatile materials boiling as low as −15° C., may also be used, providing that the polymerization pressure is increased correspondingly. Preferred diluents are essentially aliphatic hydrocarbons such as naphtha (boiling range about 90 to 120° C.), or straight run mineral spirits such as Varsol (boiling range about 150 to 200° C.), but butane, pentane, benzene, toluene, xylene, cyclohexane, butenes, pentenes or similar inert hydrocarbons are also usable, individually or in admixture with each other. In general, the aromatic solvents are not so desirable as the aliphatic ones because of the toxicity of the former. The hydrocarbon diluents are used in amounts ranging from 50 to 300 parts by wt. per 100 parts of monomers.

An important feature of the process involves the use of a substantial amount of certain ethers as co-diluents or modifiers along with the hydrocarbon diluent described above. A particularly outstanding promoter for the batch process has been found in dioxane-1,4 whose presence in the feed aids in the production of a colorless product of desirable viscosity and good drying properties, and promotes the reaction sufficiently to give about 100% conversion at 50° C., in a period of about 5–10 hours. Similarly favorable results were also obtained with the diethyl ether of ethylene glycol, $H_5C_2OCH_2CH_2OC_2H_5$, with diethyl ether $(C_2H_5)_2O$, and also with the diethyl ether of diethylene glycol, $H_5C_2O(CH_2)_2.O.(CH_2)_2.OC_2H_5$. In the batch process, diethyl ether is usable, although the initial induction period tends at times to be somewhat long. The diethyl ether of ethylene glycol is not preferred, because with it a product having an undesirably high molecular weight is produced. However, diethyl ether is the preferred ether in a continuous process as the difficulty in starting up the reaction occurs only at the beginning of the polymerization which runs for a long period of time in contrast to batching runs which have to be started up frequently. Diethyl ether is less subject to undesirable side reactions with alkali metal, and it is a more vigorous promotor than dioxane. However, dioxane is usable also, but not preferred. Other ethers useful to a still lesser extent are diethyl acetal, vinyl isobutyl ether, dihydropyrane and ethylal, all of which have a favorable effect on improving the color of the product.

In contrast to the preferred ethers named earlier herein, the four ethers just named have a moderate retarding effect on the polymerization rate. Finally, all cyclic ethers having an O—C—O— group in a ring structure, such as dioxane-1,3, dioxolane, paraldehyde and glycol ethylidene diacetal, inhibit the polymerization rate so excessively that their use is impractical. Dimethyl ether also does not serve the desired purpose, both as regards reaction rate and product quality. Thus the cyclic ethers must have the oxygen atoms separated by at least two carbon atoms.

The ether promoter is used in amounts ranging from about 1 to 100 parts, preferably 5 to 50 parts by wt. per 100 parts of monomers. In selecting the ether co-diluent it is especially desirable in many cases to select an ether having a boiling point of at least 10° C., below the lower limit of the boiling range of the hydrocarbon diluent, and thus, when using a mineral spirits having a boiling range of 150° C. to 200° C., ether co-diluents boiling between about 25 and 140° C., are preferred for the reason that their separation from the hydrocarbon diluent in the polymerized reaction mixture is greatly facilitated by virtue of the stated difference in boiling points. If the polymer is recovered in about 100% purity, the ether may conveniently boil in the range of the hydrocarbon diluent since both may be recycled together in making up the fresh feed to the reactor.

It is also advantageous to use about 10 to 50%, preferably 10 to 30 weight percent (based on catalyst) of an alcohol in the polymerization recipe. Suitable alcohols include isopropanol, isobutanol, isopentanol, secondary butanol, and tertiary butanol. The coarser the catalyst dispersion, the more essential it is to have a sufficient amount of alcohol promoter present.

The reaction time and induction period vary depending on the degree of catalyst dispersion, reaction temperature, purity of feed materials and sequence of monomer addition.

The residence time per reactor stage is about 0.5 to 6 hours, depending on the reaction conditions. It is preferred to operate with a catalyst particle size of about 1 to 50, or 10 to 50 microns, such as a mixture ranging from 20 to 40 microns. Such a catalyst can be prepared by dispersing the molten alkali metal in a hydrocarbon such as Varsol by means of a homogenizer such as an Eppenbach-Homo-Mixer and cooling the resulting dispersion below the melting point of the metal to prevent coalescence of the dispersed particles.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst.

It is preferable to initiate the continuous process by first charging the first stage of the reactor and batch reacting the charge until the reaction has reached a conversion level of at least 40–60% but which may reach 80%, and then beginning the continuous addition of reactant, solvent, modifiers and catalyst. The reactor contents flow continuously to the second vessel and styrene, solvent, modifier, and catalyst added as desired. The reaction continues in this vessel or stage from which the contents continuously flow to succeeding stages if desired. The greater the number of stages the closer the operation approaches a batch operation. From three to five stages is usually satisfactory.

Destruction of catalyst at the end of the reaction is effectively accomplished by adding to the reaction mixture a moderate excess of an anhydrous $C_1$ to $C_5$ fatty acid which is soluble in the hydrocarbon mixture, e. g. formic, acetic or pentanoic, or with sulfuric acid as described in copending application Serial No. 396,324, filed December 4, 1953, now U. S. Patent No. 2,712,561. After destruction of the catalyst the crude polymerization product containing the salts, excess acid and other impurities is neutralized with ammonia, and the neutralized product is finally filtered preferably with a filter aid such as silica gel, clay, charcoal or its equivalent. Separation can also be accomplished by centrifuging, if desired. Other ways of destroying the catalyst may be used, such as by adding alcohol, or inorganic acids.

Since the resulting polymer solution is usually too dilute for most practical use as a varnish or enamel base, it is advantageous to distill off some of the volatile hydrocarbon solvent until a product containing not less than 40% to 70% non-volatile matter is obtained, the non-volatile matter being the polymeric drying oil. Where even more highly concentrated products are desired it is possible to raise the concentration of the polymeric drying oil to as much as 99% or greater non-volatile matter by still more extensive distillation or stripping; the use of a stripping gas, such as methane or a mixture of light hydrocarbons, is advantageous where highly concentrated drying oils are desired. Alternatively, one may use a low boiling diluent such as butane, a pentane, or a low boiling naphtha in the synthesis step and thus simplify the eventual removal of the diluent from the polymeric product.

The product of the present invention is usually a solution of polymeric drying oil in a suitable hydrocarbon solvent such as solvent naphtha or mineral spirits and is, depending on the amount and type of ether used, a clear, colorless to light yellow varnish composition, the polymer content of which has a viscosity of about 0.15 to 22 poises at 50% N. V. M. and preferably 0.15 to 3.0 poises at 50% N. V. M.

If desired, the product viscosity can be readily increased within or above the limits given above by heat-bodying the polymer, preferably in 50 to 75% concentration, in the absence of air at temperatures between 200 and 300° C., e. g. at 220 to 260° C. The clear varnish composition can be brushed, poured or sprayed and gives good clear films on drying in air or baking, especially when conventional driers such as naphthenates or octoates of cobalt, lead or manganese are added thereto. Excellent films can be prepared by baking, even in the absence of driers.

Furthermore, when the drying oil compositions of the present invention are intended for use in pigmented enamels, their gloss and wetting power can be further improved by reacting them with a small amount of a polar compound such as maleic anhydride, acrylonitrile, thioglycolic acid or other equivalent materials described in copending applications Ser. No. 102,703, filed July 16, 1949 (now issued as Patent No. 2,652,342), and 106,487 filed July 23, 1949, now U. S. Patent No. 2,683,162.

Lead driers can be used also, but, unlike in the case of natural drying oil varnishes, are not necessary here. This, of course, is a decided advantage in some cases in view of the toxicity of the lead driers.

Another important advantage of the invention is that the present drying oils can be used as a varnish without the addition of any extraneous polymer or resin thereto. This further distinguishes the products of the invention from prior art drying oils, notably the natural oils such as linseed, which require the addition of rosin, ester gum or a phenolic resin thereto when a varnish is desired.

In order to make the invention more clearly understood, there is shown in the accompanying drawings one means for carrying the same into practical effect.

Figure 1 schematically illustrates the preferred equipment and flow sheet involved in carrying out the invention;

Figure 1:
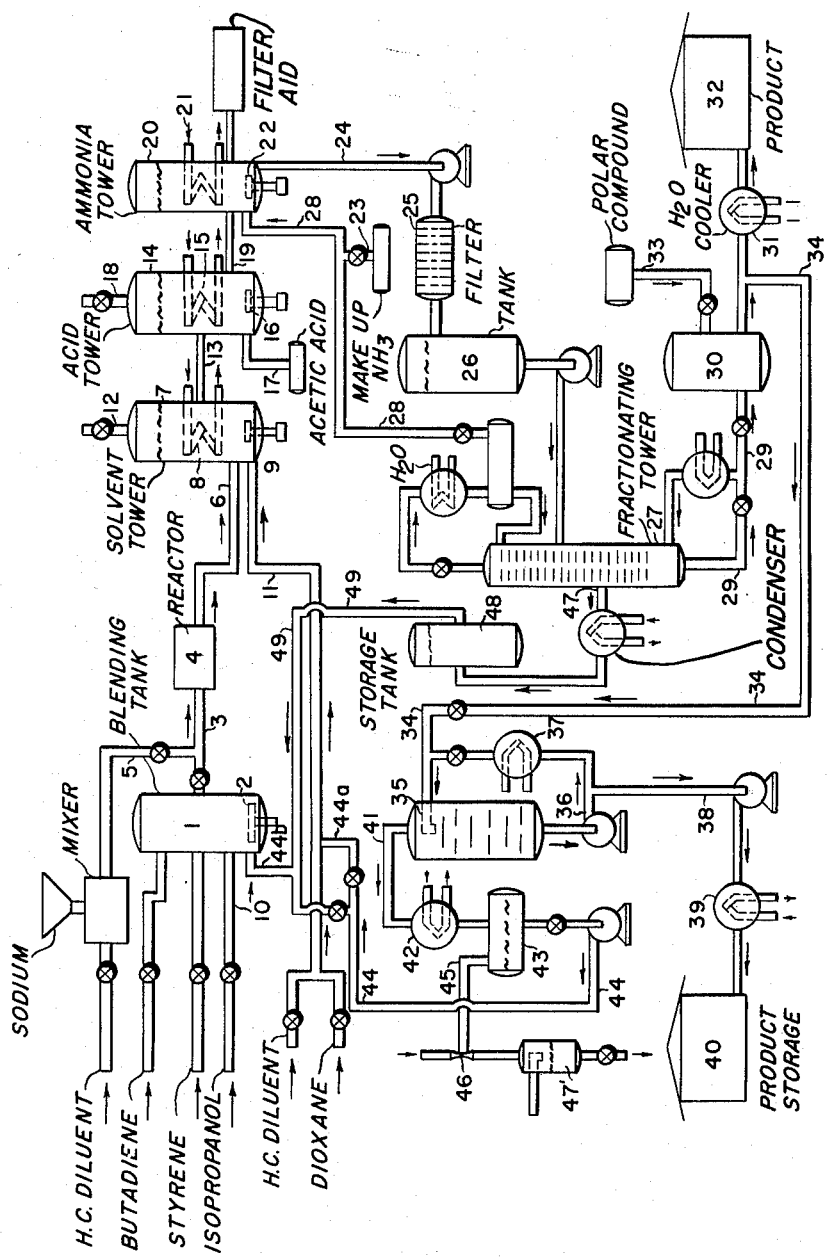

Referring to Figure 1, the reaction mixture is preferably made up in blending tank 1 into which butadiene, styrene, isopropyl alcohol, if needed, and straight run mineral spirits or other hydrocarbon diluent are introduced in the desired proportions. The reaction monomers and make-up quantities of alcohol, solvent and ether are introduced to tank 1 from conventional storage facilities as shown and further amounts of alcohol, ether, and the hydrocarbon diluent are introduced to tank 1 through cycle line 10 which leads from the recovery equipment described later. After the materials have been properly mixed in tank 1, by means of stirrer 2, a stream of the resulting mixture is withdrawn through line 3 to reactor 4. Details of the reactor arrangements are described hereinafter in reference to Figure 2. Prior to entering reactor 4 line 3 may be joined by line 5 through which alkali metal catalyst, e. g. sodium, is introduced into reactor 4 preferably in the form of a slurry of finely divided catalyst particles in mineral spirits or other suitable hydrocarbon liquid. Alternatively, catalyst line 5 may enter the reactor separately. Instead of mixing the styrene monomer into the feed in tank 1, it may be introduced directly into reactor 4 by a separate line as will be described later.

Crude reaction product is withdrawn from reactor 4 through line 6 which leads to diluent treating drum 7 which contains stirrer 9 and a suitable cooling device such as internal coil 8 capable of removing any undue heat of reaction that may be generated in this zone. In this drum the partially spent sodium catalyst contained in the reaction mixture is utilized as a treating agent to remove or destroy all water and other inhibiting impurities that are or may be present in the make-up hydrocarbon diluent and the other materials which are introduced into drum 7 through line 11. However, this treatment is necessary only if the feed materials, i. e. monomers, diluent, etc., contain poisons which must be removed. Accordingly, this treatment may be bypassed, if desired.

Water contained in the make-up diluent reacts with the sodium catalyst in drum 7 and liberated hydrogen is withdrawn overhead through line 12. The crude product, diluted with an amount of make-up hydrocarbon solvent approximately compensating for the amount of solvent contained in the finished product, is withdrawn from drum 7 through line 13 to another drum 14 provided with cooling device 15 and agitator 16. A catalyst quenching agent, such as 100% molal excess of acetic acid, is continuously introduced into drum 14 through line 17 in order to react with the remaining sodium catalyst and thereby convert it into sodium acetate which is an inert, easily filtrable salt. Hydrogen gas produced in this reaction is removed from acid treating drum 14 through line 18. From drum 14 the acidified crude product is continuously transferred through line 19 to drum 20 also preferably provided with a cooling device 21 and agitator 22. In drum 20 the excess free acid is neutralized with ammonia gas which is bubbled in through line 23. A suitable filter aid such as kieselguhr or fuller's earth is also introduced into ammonia treating drum 20 so as to facilitate subsequent filtration of the salts from the product. It is particularly convenient to add the filter aid in the form of a thick slurry, e. g. as a dispersion in the same kind of hydrocarbon used as reaction diluent.

From drum 20 the crude product is withdrawn through line 24 and passed through conventional filtration equipment such as a filter press or even a continuous rotary vacuum filter 25. Efficient use of the latter is possible due to the crystalline form of the filtrate obtained when operating in accordance with the novel process. The filtered product is then run off to storage drum 26 which serves to smooth out any undue variations in flow rate. From drum 26 the filtered product is fed continuously to distillation tower 27 which removes excess ammonia as an overhead stream 28, concentrates a bottom stream 29 containing the oily polymer of the preferred concentration of about 40 to 80% polymer in hydrocarbon diluent, and allows the withdrawal of a vapor side stream 47 which contains ether, any residual isopropyl alcohol as well as excess hydrocarbon diluent. The vapor stream 47 is condensed, passed to storage tank 48 and eventually recycled to blending tank 1 through line 49.

The ammonia stream 28 is recycled to treating tank 20 after being supplemented with fresh ammonia stream 23. Product stream 29 may be passed through heat treating drum 30 where the drying oil is kept for about 30 to 120 minutes at a temperature of about 120 to 300° C., preferably about 180 to 210° C. or above, when bodying in the presence of one or more of the previously mentioned polar compounds, and 220 to 260° C. when these compounds are omitted. The bodying increases the viscosity to a desired value. Finally the product is passed through cooler 31 to storage tank 32. If desired, a small amount, such as 0.01 to 1.5% (based on oily polymer) of a polar compound such as maleic anhydride may also be fed continuously to tank 30 through line 33 in order to further improve the pigment wetting properties of the product. Whether or not the oil is subjected to the heat treatment with or without maleic anhydride depends upon the use to which the product is to be put and may be omitted, if desired.

The storage tank is preferably provided with a steam coil or other suitable heating device adapted to raise the temperature of the tank contents to about 40° C., or higher if necessary to heat the viscous product sufficiently for withdrawal purposes.

Furthermore, all or a part of the product may be tapped off through line 34 to be concentrated further to a concentration between 80 and 100%. This can be done by any convenient means, as for example, by stripping the hydrocarbon solvent from the more dilute product by circulation through baffle drum 35, return line 36 and heater 37, at a temperature of about 150° C., to 200° C., under reduced pressure of about 0.5 to 2 lbs./sq. inch absolute. The concentrated product is finally withdrawn from the bottom of the tower through line 38 and cooler 39 to be heated, if necessary to a temperature such as 90° C. in storage tank 40, to maintain the viscosity of the product in a range permitting easy pumping. The hydrocarbon solvent stripped overhead is passed through line 41 and water cooler 42 to separating drum 43 wherefrom the condensed, dry hydrocarbon solvent is recycled either through lines 44, 44a and 11 to solvent treating drum 7, or through lines 44, 44b and 10 directly to blending tank 1. The vacuum necessary for the stripping operation can be obtained readily by means of the illustrated arrangement consisting of aspirator line 45 connected to a suitable steam jet ejector 46 which in turn is connected to condenser 47'.

Alternatively, instead of concentrating the oily polymer in drum 35 as described above, the drum may be replaced by a multiplate stripping tower operated under proper conditions, e. g. at a temperature of about 150° C. and a pressure of 0.5 to 2 lbs./sq. inch absolute; the use of a suitable stripping gas such as methane improves the efficiency of the tower.

The hydrocarbon diluent, alcohol and ether-containing vapor side stream 47 withdrawn from principal fractionation tower 27 is recycled through storage tank 48 and return lines 49 and 10 to blending tank 1.

In developing the present invention it was observed that, even with a long nominal residence time, only very low conversion levels could be obtained when the reaction mixture was simply charged to and withdrawn from a single agitated reaction tank in a continuous manner. It was always realized that continuous introduction of fresh feed into a one-stage equilibrium reactor theoretically can never be driven to complete conversion, since this implies the absence of any unreacted monomers in the product stream and therefore none in the reactor. However, even when this effect was taken into account, the conversion level was found experimentally to be surprisingly low in such a continuous equilibrium reactor. A possible explanation may be in the factors which are inherent in the type of feed used herein and which are responsible for the initial induction period in batch operations; the same factors poison the continuous reaction to such an extent as to make polymerization in a single reaction tank continuously fed with fresh feed impractical.

Figure 2:
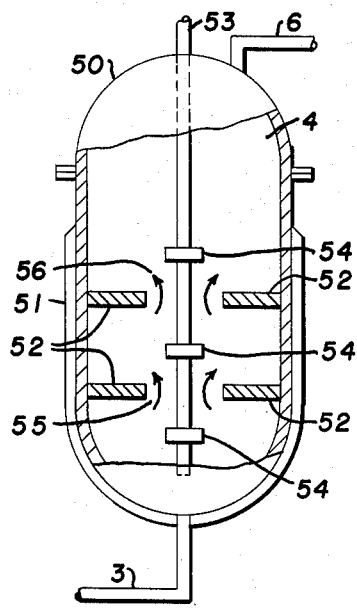
Figure 2 illustrates a suitable type of multi-stage polymerization reactor.

It has now been discovered that a high quality drying oil can be obtained in a particularly efficient, continuous method by using a reactor arrangement as shown in Figure 2. The illustrated reactor consists of a large vessel 50 surrounded by cooling jacket 51 and divided into three stages by means of horizontal baffles 52. A vertical shaft 53 bearing blades 54 is disposed centrally of vessel 50 as an agitator. Annuli 55 and 56 surrounding shaft 53 are provided with baffles 52 to allow the contents of the reactor to flow from stage to stage. In this embodiment of the invention the feed mixture from blending tank 1 (shown in Figure 1) together with a suitable amount of the sodium catalyst slurry from line 5 (shown in Fig. 1) are pumped continuously into the bottom of tank 50, below the lower baffle 52 forming the first stage. The temperature of the reaction mixture is gradually raised from the room temperature to about 55–75° C., and any feed impurities presumably responsible for the induction period of the polymerization reaction are destroyed, or the feed mixture is activated by contact with the catalyst. From the first stage the warm feed and catalyst mixture is continuously introduced through annulus 55 into stage 2 where the reaction, which is normally exothermic, is continued at a temperature between 60 and 75° C. From stage 2 the mixture passes through annulus 56 to stage 3 where the reaction is concluded at a temperature of 65–80° C.

Additional catalyst and/or alcohol promoter may be added to stages 2 and 3, if desired.

Reactor 4 is provided with temperature control means (for heating or cooling) either by an external jacket or a heat exchanger constructed within the tank. For example, allowing for a nominal residence time of about 1 to 10 hours at about 60 to 70° C., the monomer conversion in stage 1 will be between about 80% and 85%, whereupon this partially polymerized mixture is passed continuously into stage 2 to where the reaction is carried to 90–95% completion at a suitable temperature which is maintained preferably between 60 and 75° C. Substantially 100% conversion is obtained in stage 3 at a temperature of 65 to 80° C. It will be understood, of course, that the actual optimum size of the component parts of the reactor depend somewhat on composition and flow rate of the reaction mixture, the reaction temperature, as well as the size relation between the several component parts of the reactor. It will be observed that each part serves a distinct function, namely, stage 1 serves principally to continuously activate the charge, and to carry out the major part of the polymerization, stages 2 and 3 serve to continuously polymerize the reaction to substantially complete conversion, which cannot be obtained in stage 1. From vessel 50 the crude product passes through line 6 to the several treating drums and other finishing equipment shown in Figure 1 and described earlier herein.

A refinement serving to increase the efficiency of the process and to raise the quality of the product involves feeding the diolefin and styrene monomers to different parts of the reaction zone illustrated in Figure 2 in order to reduce the formation of polymer fractions having a high gel content, which fractions tend to be formed in the early stages of the reaction. The formation of these objectionable polymer fractions can be reduced by not feeding the styrene as shown in Figure 1, but instead at least a portion of the styrene monomer is taken from storage directly to stage 2 so that all of the styrene is not present in the initial stage of the reaction taking place in reactor 4.

Figure 3:
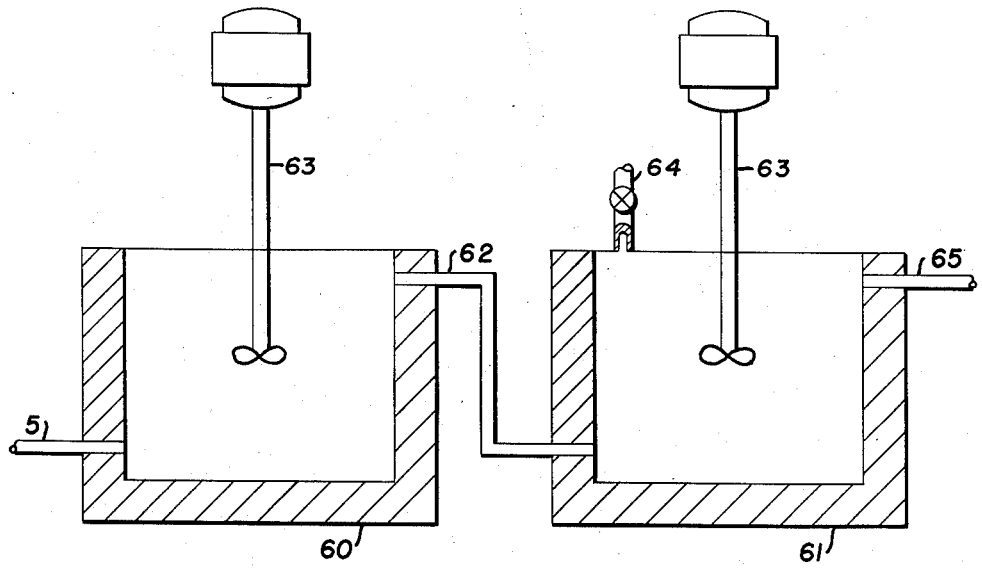
Figure 3 illustrates another embodiment involving a two-stage reactor.

Figure 3 illustrates another embodiment of the invention utilizing two vessels. From tank 61 the crude product passes through line 65 to the several treating drums and other finishing equipment shown in Fig. 1. The illustrated reactor consists of externally cooled or heated tanks 60 and 61 connected in series by line 62. Each tank is provided with agitator 63. In this embodiment of the invention the feed mixture from blending tank 1 (shown in Figure 1) together with a suitable amount of the sodium catalyst slurry from line 5 (shown in Fig. 1) are pumped continuously into tank 60. The temperature of the reaction mixture is maintained at about 60-95° C. From tank 60, the partially polymerized feed and catalyst mixture is continuously introduced by line 62 into agitated reaction tank 61 where the reaction, which is normally exothermic is completed at a temperature between 65 and 95° C. and essentially 100% conversion is obtained.

Additional catalyst and/or alcohol promoter may be added to reactor 61 through line 64. Tanks 60 and 61 are provided with temperature control means or in the same manner as reactor 4 of Figure 2. Additional reactors may be added in series with the two shown in Figure 3, if needed.

EXAMPLE I

A series of continuous runs were made in a large vessel divided by horizontal baffles into a three-stage unit. Passage from stage to stage was accomplished through a small annulus surrounding a centrally disposed vertical agitator shaft.

Feed mixtures having the following compositions in weight percent on monomers:

|  | 1 | 2 | 3 |
|---|---|---|---|
| Modifier: |  |  |  |
| Dioxane | 34.4 |  | 30 |
| Ethyl ether |  | 18.1 |  |
| Butadiene | 77.1 | 81.9 | 80 |
| Styrene | 22.9 | 18.1 | 20 |
| Close cut naphtha | 172 | 135.7 | 89 |
| Isopropyl alcohol | 0.3 | 0.3 | 0.3 | were introduced into the bottom of the lowest stage (stage 1).

A batch operation was carried out in stage 1, using feed blend No. 1 and 2.1 wt. percent sodium. When the conversion had reached about 80%, feed and catalyst were started and continued for the duration of the run. Feed rate was set to give a hold-up time of about two hours in stage 1, two hours in stage 2, and six hours in stage 3, corresponding to a 7.5 gallons per hour feed rate. The effluent from the third stage was collected and neutralized with 2 molar equivalents of acetic acid to sodium. The neutralized material was then treated with an excess of ammonia, filtered and stripped. Operating conditions are shown in Table I and the experimental results in Table II.

*Table I*

| Run hours | Start up [a] | 8.5-30 | 30-47.5 | 47.5-83 | 87-130 |
|---|---|---|---|---|---|
| Operating conditions: |  |  |  |  |  |
| Temperatures, ° C. (avg.)— |  |  |  |  |  |
| Stage 1 | 55-75 | 63 | 65 | 68 | 75 |
| Stage 2 |  | 65 | 66 | 71 | 77 |
| Stage 3 |  | 66 | 67 | 73 | 78 |
| Jacket | 115 | 59 | 60 | 64 | 71 |
| Pressure, p. s. i. g. | 45 | 45 | 43 | 44 | 50 |
| Residence time, hours— |  |  |  |  |  |
| Stage 1 |  | 1.8 | 1.77 | 1.77 | 1.77 |
| Stage 2 |  | 1.8 | 1.77 | 1.77 | 1.67 |
| Stage 3 |  | 5.4 | 5.31 | 5.31 | 5.03 |
| Total |  | 9.0 | 8.85 | 8.85 | 8.47 |
| Production rate: |  |  |  |  |  |
| Reactor effluent, percent NVM at 100% conv. |  | 28.6 | 28.7 | 34.4 | 37.8 |
| Total diluent, weight percent on monomers |  | 215 | 215 | 173 | 134 |
| Lbs. polymer/SD at 100% conv. |  | 360 | 367 | 412 | 488 |

[a] Batch start-up made by filling first stage with feed and pumping in the required amount of sodium. Continuous operations started when batch reaction reached 81% conversion.

*Table II*

| Run hours | Start up [a] | 8.5-30 | 30-47.5 | 47.5-83 | 87-130 |
|---|---|---|---|---|---|
| Feed: |  |  |  |  |  |
| Blend number | 1 | 1 | 1 | 2 | 3 |
| Modifier | Dioxane | Dioxane | Dioxane | Ether | Dioxane |
| Weight percent monomers | 32.7 | 32.7 | 32.7 | 39.4 | 45.6 |
| Rate, cc./min | 15 gallons | 465 | 475 | 475 | 475 |
| Catalyst—sodium:[b] |  |  |  |  |  |
| First stage— |  |  |  |  |  |
| Weight percent dispersion | 5.0 | 5.0 | 6.92 | 6.92 | 5.0 |
| Rate, cc./min | 75.30 | 60 | 59.6 | 60.2 | 60 |
| Percent sodium on monomers [c] | 2.1 | 2.20 | 2.96 | 2.53 | 1.54 |
| Second stage— |  |  |  |  |  |
| Weight percent dispersion |  |  |  |  | 10.0 |
| Rate, cc./min |  |  |  |  | 29.9.[d] |
| Percent sodium on monomers [c] |  |  |  |  | 1.53 |
| Total percent sodium on monomers [c] | 2.1 | 2.20 | 2.96 | 2.53 | 3.07 |
| Products from equilibrium periods: |  |  |  |  |  |
| Cut number | 1 | 2 | 3 | 4, 5 | 6, 7 |
| Run hour (initial-final) | 27-30 | 39-47 | 70-77 | 77-83, 110-118 | 118-126, 126-130 |
| Conversion range | 96-100 | 91-99 | 100 | 100, 94-97 | 93-96, 90-94 |
| Viscosity, poise at 50% NVM | 0.5 | 0.4 |  | 0.4 | 0.7, 0.7 |
| Gardner color at 50% NVM |  | 1-2 |  | 1-2 | 1-2, 1-2 |
| Gel. weight percent on polymer at hour [e] |  |  | 2.5(71) |  | 2.7(128) |

[a] Batch start-up made by filling first stage with feed and pumping in the required amount of sodium. Continuous operations started when batch reaction reached 81% conversion.
[b] Sodium dispersed as 30 weight percent in Varsol C.
[c] Values reported are calculated on the average rate for the run hours given.
[d] During a 6-hour period (hrs. 94-100) 15 weight percent sodium dispersion was successfully pumped at this rate.
[e] Samples from third stage neutralized with acetic acid, filtered and residue naphtha washed. Residue dried and gel calculated by discounting sodium acetate. Values given should be considered as order of magnitude only.

The above data clearly show that with dioxane as the modifier complete conversion of the monomers can be accomplished on a once-through basis by multi-stage operation, particularly when about 3% sodium on monomers is added to the first stage. When diethyl ether is used as the modifier considerably higher conversion is realized in the first stage and complete conversion is realized in the third stage with only 2.5% sodium added to the first stage. The higher temperatures in the latter stages shortens the overall reaction time. Above about 97° C. sodium is molten, which is permissible and desirable in the viscous liquid in these stages. The viscous liquid aids in prevention of agglomeraton of the molten sodium.

EXAMPLE II

A continuous run was made in an even larger vessel divided by horizontal baffles into a five-stage unit. Passage from stage to stage was again accomplished through a small annulus around the central agitator shaft. One hundred parts of a mixture of fresh raw materials having the following composition, in weight percent:

| | |
|---|---|
| Styrene | 17.8 |
| Butadiene | 71.3 |
| Dioxane | 2.6 |
| Isopropyl alcohol | .2 |
| Naphtha | 8.1 |
| | 100.0 | was mixed with 98 parts of a recycle stream having the following composition, in weight percent:

| | |
|---|---|
| Dioxane | 25.1 |
| Naphtha | 74.8 |
| Isopropyl alcohol | 0.1 |
| | 100.0 | to produce the reactor feed mixture having the following composition, in weight percent on monomers:

| | |
|---|---|
| Styrene | 20.0 |
| Butadiene | 80.0 |
| Dioxane | 30.4 |
| Isopropyl alcohol | 0.3 |
| Naphtha | 91.5 |

Under lined-out operating conditions this reactor feed mixture was continuously introduced into the bottom of the lowest stage (stage 1) at the rate of 54 gallons/hr. At this rate the residence time in each stage was two hours or a total of ten hours for the five stages. Temperatures in the reactor were controlled by adjusting the temperature of cooling water to the reactor jackets. The temperature in the first and fifth stages were maintained at 52° C. and 74° C., respectively, with the three middle stages ranging between these temperatures. The pressure in the reactor was about 40 p. s. i. g. A 15 wt. percent dispersion of sodium in mineral spirits having a normal boiling range of 150° C. to 205° C. was continually (pulse flow) injected into the first stage, along with the feed mixture previously mentioned, at a rate of 14 lbs. per hour, equivalent to about 1.4 wt. percent sodium on the monomers. The average size of the sodium particles in the dispersion was less than 50 microns.

At these operating conditions the conversions in the first and fifth stages were 50% and 100%, respectively, with the conversions in the three middle stages ranging between these conversions. The viscosity of the product from the fifth stage was about 1.3 poises (Gardner) at 50% NVM.

The effluent from the fifth stage was continuously neutralized in an agitated vessel with 1.6 molar equivalents of glacial acetic acid to sodium. The neutralized material was then continuously treated with an excess of ammonia, filtered and stripped. It may be noted that by providing two additional reactor stages and keeping the conversion in the first stages at intermediate levels by controlling the temperature in the first stages at a lower level and using less sodium catalyst, the viscosity of the product at 50% NVM, which is a measure of molecular weight, was considerably increased.

The foregoing description is illustrative of the present invention. However, it will be apparent to those skilled in the art that numerous variations and modifications are possible without departing from the spirit of the invention or from the scope of the appended claims.

The nature of the present invention having been thus fully set forth and specific examples of the same given, what is claimed as new and useful and desired to be secured by Letters Patent is:

1. Process for producing a polymeric hydrocarbon drying oil which comprises continuously adding a feed mixture of 75 to 85 parts of butadiene, 25 to 15 parts of styrene, 200 to 300 parts of an inert hydrocarbon diluent boiling between 150 and 200° C., about 5 to 50 parts of an ether modifier having 2 to 8 carbon atoms per molecule, chosen from the group consisting of alkyl ethers and cyclic diethers having the oxygen atoms separated by at least two carbon atoms, and about 1 to 5 parts of finely divided alkali metal catalyst, and 10 to 50% of an alcohol, based on alkali metal, to a first polymerization zone, reacting said mixture without further addition of feed and catalyst until a conversion of 40–80% is obtained at a temperature of 55–75° C., then commencing the continuous introduction of feed and catalyst, continuously passing the reactants to a second polymerization zone while continuing the reaction in the first zone by the introduction of feed and catalyst, maintaining the reaction in the second zone at a temperature of 60–75° C. and then completing the conversion in a third zone at a temperature of 65–80° C. while continuing the polymerization in the first two zones.

2. Process according to claim 1 in which dioxane is used as the modifier and about 3% sodium is used as catalyst in the first zone.

3. Process according to claim 1 in which diethyl ether is used as the modifier and about 2.5% sodium is used as catalyst in the first zone.

References Cited in the file of this patent

UNITED STATES PATENTS

| | | |
|---|---|---|
| 2,623,032 | Banes et al. | Dec. 23, 1952 |
| 2,669,526 | Koenecke et al. | Feb. 16, 1954 |
| 2,672,425 | Gleason et al. | Mar. 16, 1954 |
| 2,688,646 | Russell | Sept. 7, 1954 |
| 2,728,801 | Jaros et al. | Dec. 27, 1955 |
| 2,728,804 | Mueller | Dec. 27, 1955 |